(12) United States Patent
Watanabe et al.

(10) Patent No.: US 9,498,980 B2
(45) Date of Patent: Nov. 22, 2016

(54) PRINTING APPARATUS, PRINTING METHOD AND IMAGE PROCESSING APPARATUS

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventors: Fumiyuki Watanabe, Shizuoka (JP); Saravanacoumar Dourecannou, Pondicherry (FR)

(73) Assignees: KABUSHIKI KAISHA TOSHIBA, Tokyo (JP); TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/576,530

(22) Filed: Dec. 19, 2014

(65) Prior Publication Data

US 2016/0176200 A1    Jun. 23, 2016

(51) Int. Cl.
*B41J 11/60* (2006.01)
*B41J 2/045* (2006.01)

(52) U.S. Cl.
CPC ............. *B41J 11/60* (2013.01); *B41J 2/04518* (2013.01)

(58) Field of Classification Search
CPC .............................. B41J 11/60; B41J 2/04518
See application file for complete search history.

(56) References Cited

U.S. PATENT DOCUMENTS

2014/0211247 A1* 7/2014 Matsuda ............... G06F 3/1273
358/1.15

FOREIGN PATENT DOCUMENTS

JP          2002-112022          4/2002

\* cited by examiner

*Primary Examiner* — Geoffrey Mruk
(74) *Attorney, Agent, or Firm* — Amin, Turocy & Watson LLP

(57) ABSTRACT

In accordance with an embodiment, a printing apparatus comprises a data acquisition section configured to acquire printing data; an image determination section configured to determine a character part or a picture part of an image indicated by the printing data; an image process section configured to erase the picture part or the part other than the character part from the image indicated by the printing data; and a printing control section configured to execute a printing of an image processed by the image process section.

6 Claims, 9 Drawing Sheets

PRINTING APPARATUS, PRINTING METHOD AND IMAGE PROCESSING APPARATUS

FIELD

Embodiments described herein relate generally to a printing apparatus, a printing method and an image processing apparatus.

BACKGROUND

There are many documents in which pictures (a photograph, a painting and the like) are interwoven in the text. In such a document, characters and pictures may be interwoven complexly, and thus it is hard to read. Even if it is such a document, the conventional apparatus prints or displays it directly, which causes inconvenience for a user to read the document.

DETAILED DESCRIPTION

Figure 1:
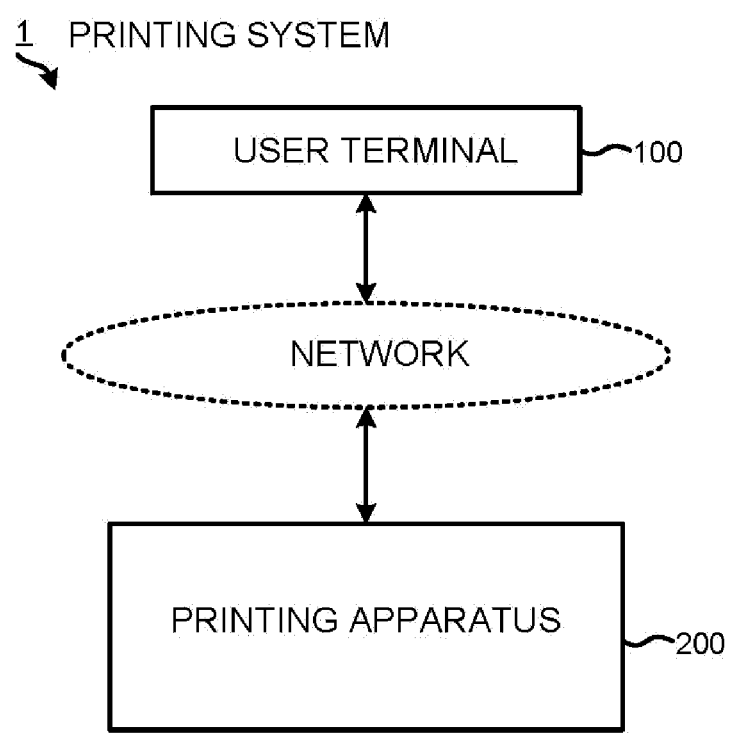
FIG. 1 is a diagram illustrating the constitution of a printing system according to an embodiment 1.

In accordance with one embodiment, a printing apparatus comprises a data acquisition section configured to acquire printing data; an image determination section configured to determine a character part or a picture part of an image indicated by the printing data; an image process section configured to erase the picture part or the part other than the character part from the image indicated by the printing data; and a printing control section configured to execute a printing of an image processed by the image process section.

Hereinafter, the present embodiment is described with reference to the accompanying drawings. Further, the same or equivalent components are indicated by the same reference numerals in the drawings and repetitive description is not provided.

Embodiment 1

FIG. 1 is a diagram illustrating a printing system comprising a printing apparatus according to the embodiment. A printing system 1 comprises a user terminal 100 and a printing apparatus 200. The user terminal 100 and the printing apparatus 200 are connected with each other via a network such as an LAN (Local Area Network) and the like.

The user terminal 100, which is a user operation terminal such as a personal computer and the like, communicates with the printing apparatus 200 according to an instruction of a user.

Figure 2:
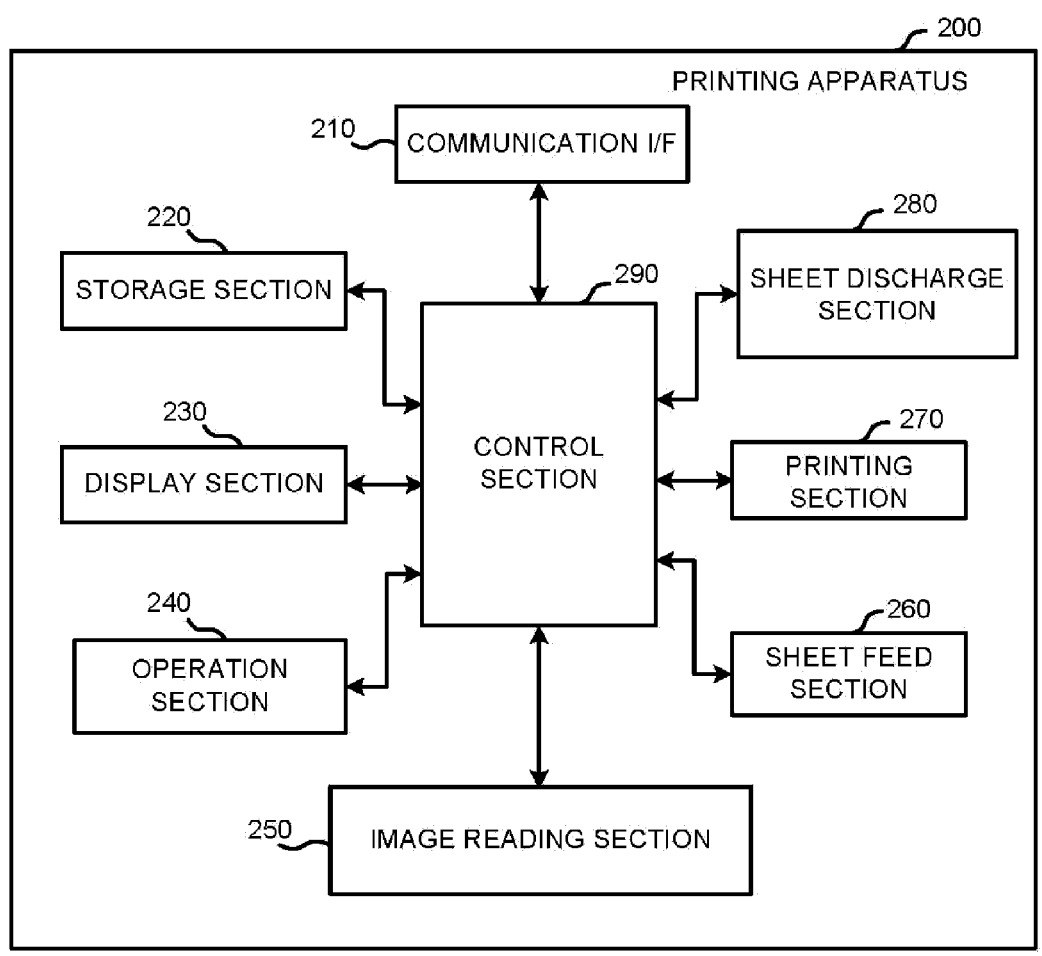
FIG. 2 is a block diagram illustrating a printing apparatus according to the embodiment 1.

The printing apparatus 200 is an apparatus that has a printing function such as a copier and the like. As shown in FIG. 2, the printing apparatus 200 includes a communication interface 210, a storage section 220, a display section 230, an operation section 240, an image reading section 250, a sheet feed section 260, a printing section 270, a sheet discharge section 280 and a control section 290.

The communication interface 210 is a network connection interface for connecting the printing apparatus 200 with a network. The communication interface 210 is, for example, an LAN interface used for connecting with a communication machine such as a router through an LAN cable, or a wireless LAN interface used for connecting with a wireless LAN base unit via a wireless network. The communication interface 210 communicates with the user terminal 100 according to the control of the control section 290.

The storage section 220 is a storage device capable of reading and writing data such as a. DRAM (Dynamic Random Access Memory), an SRAM (Static Random Access Memory), a flash memory, a hard disc and the like. Setting data such as an erasing setting used by the control section 290 is stored in the storage section 220. The erasing setting is used when the control section 290 executes a later-described printing processing. The details of the erasing setting are described in the later-described printing processing. Further, feature data obtained by extracting the feature of each of the plurality of characters having a high use frequency is stored in the storage section 220. The feature data is used in the later-described printing processing.

Figure 3:
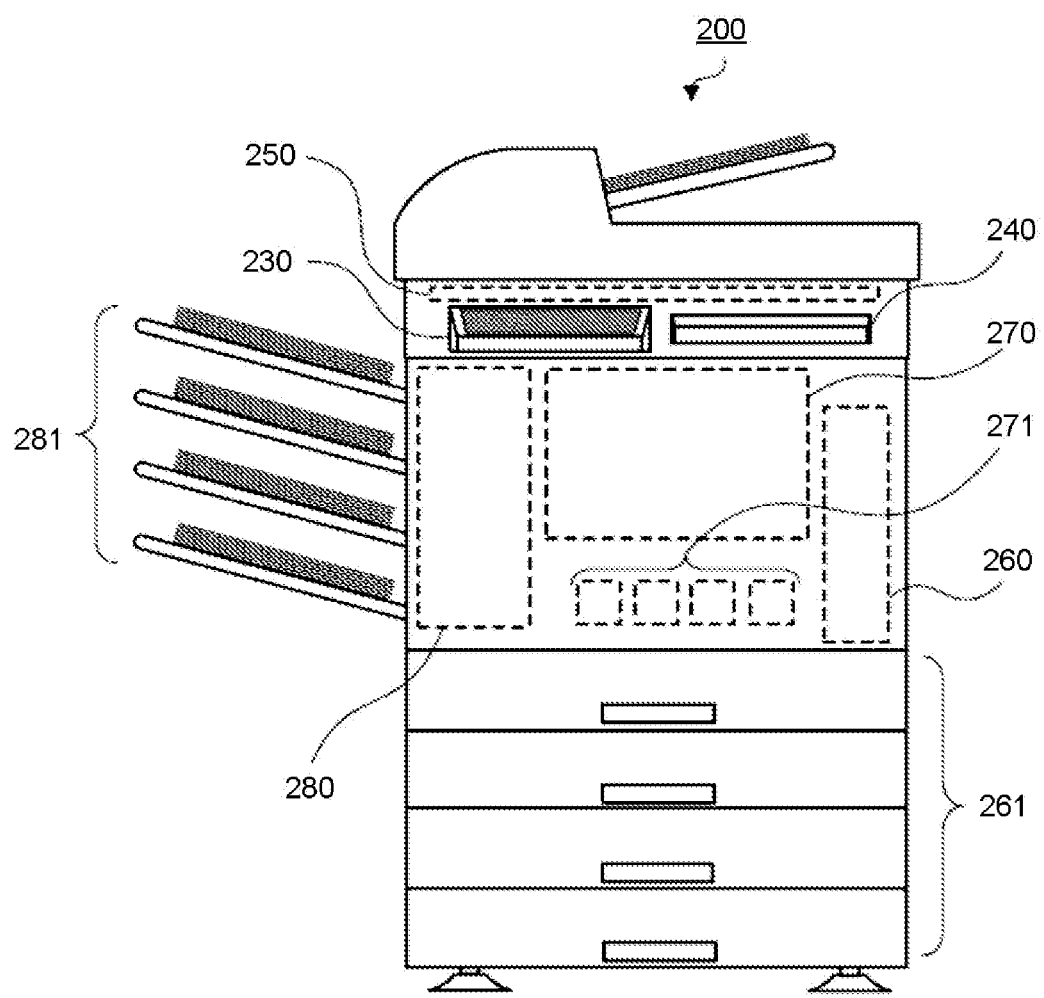
FIG. 3 is a diagram illustrating the appearance of the printing apparatus according to the embodiment 1.

The display section 230 is a device used for outputting various kinds of information to the user. The display section 230 is a display device such as an LCD (Liquid Crystal Display), an organic EL display (Organic Electro-Luminescent Display) and the like. As shown in FIG. 3, the display section 230 is arranged on the front surface of the printing apparatus 200. The display section 230 displays an image according to the control of the control section 290.

The operation section 240 is a user interface such as a button, a switch, a touch panel and the like. The operation section 240 notifies the control section 290 of an input from the user.

The image reading section 250 is an image reading device which reads an image recorded on a sheet. For example, the image reading section 250 is an image capturing device such as a scanner, a camera and the like. The image reading section 250 reads an image on the sheet and then stores it in the storage section 220 according to the control of the control section 290.

The sheet feed section 260 is a conveyance device for feeding a sheet to the printing section 270. The sheet feed section 260 is, for example, a pickup roller for taking out a sheet S from a sheet feed tray 261 where sheets are stacked, a conveyance roller for conveying the picked up sheet towards the printing section 270, and the like. The sheet feed section 260 feeds a sheet to the printing section 270 according to the control of the control section 290.

The printing section 270 is a printing device such as an inkjet printer, a laser printer and the like. The printing apparatus 200 is provided with an ink storage body 271 (where a plurality of ink different in color is stored) in a detachable manner. The ink storage body 271 includes, for example, black, blue, red and yellow ink tanks. The printing section 270 carries out a printing on a sheet using the ink stored in the ink storage body 271. Further, in a case where the printing section 270 is a laser printer, it is possible to replace the ink with toner.

The sheet discharge section 280 discharges the sheet printed by the printing section 270 to the outside of the printing apparatus 200. The sheet discharge section 280 is a conveyance roller for conveying the sheet, and the like. The sheet discharge section 280 discharges, according to the control of the control section 290, the sheet subjected to a printing processing to a sheet discharge tray 281.

The control section 290 is a processing device such as a processor and the like. The control section 290 controls the printing apparatus 200. The control section 290 operates according to a program stored in an ROM (Read Only Memory) (not shown) or an RAM (Random Access Memory) (not shown) to realize various operations including the later-described "printing processing".

Figure 4:
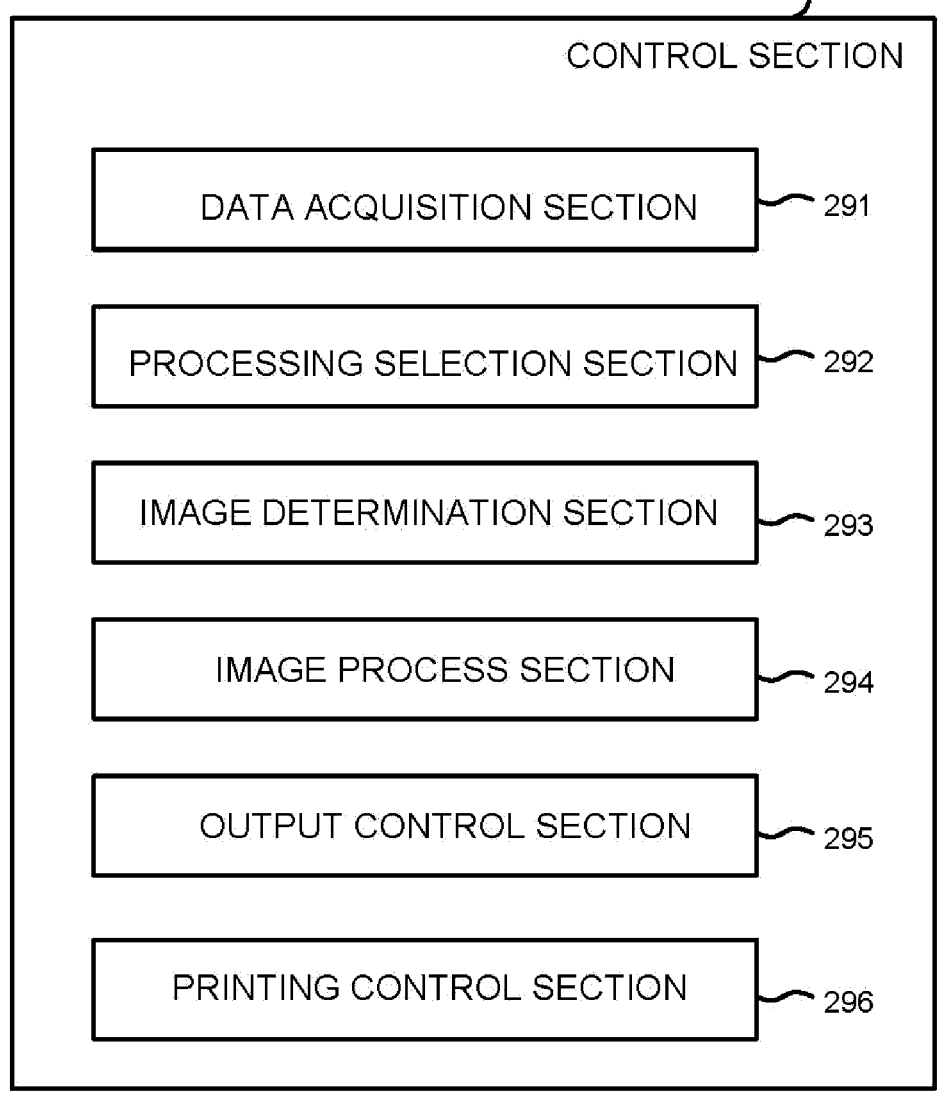
FIG. 4 is a functional block diagram illustrating a control section provided in the printing apparatus according to the embodiment 1.

By operating according to the program described above, the control section 290 functions as a data acquisition section 291, a processing selection section 292, an image determination section 293, an image process section 294, an output control section 295 and a printing control section 296, as shown in FIG. 4. Operations of the data acquisition section 291 to the printing control section 296 are described in the later-described printing processing. Further, the control section 290 may be one processor, or a plurality of processors.

Next, the operations of the printing apparatus 200 with such a constitution are described.

Figure 5:
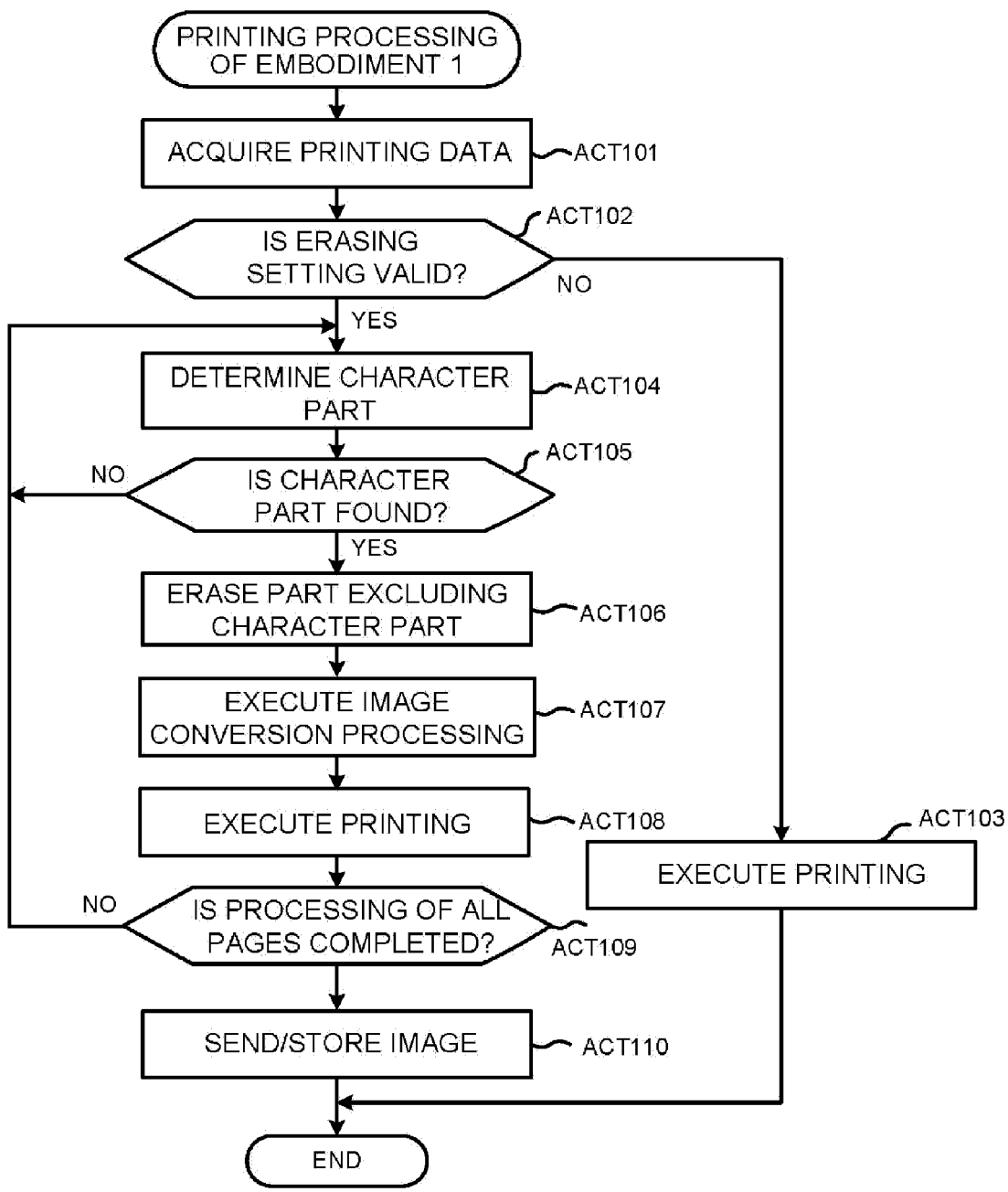
FIG. 5 is a flowchart illustrating a printing processing according to the embodiment 1.

The control section 290 of the printing apparatus 200 starts a printing processing when receiving a printing start command from the user. The printing start command may be sent from the operation section 240, or sent from the user terminal 100. Hereinafter, the printing processing is described with reference to the flowchart in FIG. 5.

The data acquisition section 291 acquires printing data (ACT 101). The printing data may be the image data read by the image reading section 250, or the image data received from the user terminal 100 via a network. Further, it is assumed in the embodiment 1 that the printing data (image data) acquired by the data acquisition section 291 is set to image data of a plurality of pages.

Sequentially, the processing selection section 292 acquires the setting data from the storage section 220. Then, the processing selection section 292 determines whether or not the erasing setting in the setting data is valid (ACT 102). The erasing setting is a setting for determining whether the printing apparatus 200 prints the printing data directly or prints the printing data after the part other than the character part is erased. The erasing setting is set by operating the printing apparatus 200 by the user. Further, the character part refers to an area where characters are recorded in the image indicated by the printing data (image data).

In a case in which the erasing setting is invalid (NO in ACT 102), the printing control section 296 controls the printing section 270 to print the printing data acquired in ACT 101 directly (ACT 103).

In a case in which the erasing setting is valid (YES in ACT 102), the image determination section 293 specifies the first page of those pages of which printing data hasn't been used in a printing. Then, the image determination section 293 determines the character part of the specified page (hereinafter referred to as image simply) (ACT 104). For example, the image determination section 293 searches an image based on the feature data stored in the storage section 220 to determine an area corresponding to the feature data in the image. Then, the image determination section 293 determines the area that is found through the searching and corresponding to the feature data in the image as the character part. Further, as to the determination method of the character part, various existing methods may be used. For example, the determination method of the character part may use a character recognition method used in the existing OCR (Optical Character Recognition) software.

Sequentially, the processing selection section 292 determines whether or not the character part in the image determined in ACT 104 is found (ACT 105). In a case in which the character part is not found (NO in ACT 105), the printing control section 296 returns the processing to the processing in ACT 104. That is, in a case in which the character part is not found, the printing control section 296 executes no printing of an image.

In a case in which the character part is found (YES in ACT 105), the image process section 294 erases the part other than the character part from the image (ACT 106). For example, the image process section 294 replaces the pixel value of the part other than the character part with 0 or a value that indicates the white. In the following description, for facilitating the understanding, the image in which the part other than the character part is erased is referred to as an erased image.

Sequentially, the image process section 294 executes, for the erased image generated in ACT 106, a conversion processing to make the image to be seen easily (ACT 107). For example, the image process section 294 executes a processing for erasing a low-density part from the erased image. The low-density part refers to a pixel part having a density value lower than a pre-set density value. Specifically, the image process section 294 may execute the following processing.

First, the image process section 294 converts the erased image generated in ACT 106 into a gray-scale image. Then, the image process section 294 determines a pixel of which the density value is lower than a threshold value (taking a pre-set density value as a threshold value) in the gray-scale image. Then, the image process section 294 replaces the pixel value of the determined pixel with 0 or a value that indicates the white. The density value taken as the threshold value may be a value set in the printing apparatus 200 in advance as the initial value of the printing apparatus 200, or a value set by the user. For example, the user writes a set value in the storage section 220 through the operation section 240 or the communication interface 210. Then, the image process section 294 determines a low-density part by taking the set value recorded in the storage section 220 as the threshold value and then erases the low-density part from the gray-scale image.

If the image conversion is completed, the printing control section 296 controls the printing section 270 to print the image generated in ACT 107 (ACT 108).

Next, the processing selection section 292 determines whether or not the processing of all pages is completed (ACT 109). In a case in which the printing of all pages isn't completed (NO in ACT 109), the processing selection section 292 returns the processing to the processing in ACT 104.

In a case in which the printing of all pages is completed (YES in ACT 109), the output control section 295 stores the image processed by the image process section 294 in the storage section 220. In a case in which a printing is started based on the printing start command received from the user terminal 100, the output control section 295 may send the processed image to the user terminal 100 (ACT 110). At this time, the processed image stored or sent by the output control section 295 may be the erased image generated in ACT 106, or the image generated in ACT 107. When the storage or the sending of the processed image is completed, the control section 290 ends the printing processing.

According to the present embodiment, since the image process section 294 has erased the part other than the character part from the image, the printing apparatus 200 can provide a document that is easy to read and only has the character part for the user. Further, the printing apparatus 200 automatically erases the part other than the character part and then prints the character part, and in this way, there is no heavy burden placed on the user to obtain the erased image. In addition, because the part other than the character part has been erased, it is possible to reduce the amount of the ink used in the printing by the printing apparatus 200.

Further, the image process section 294 further erases the low-density part from the image after the part other than the character part is erased. In a case where there is a thin background image behind the character, the background image is also erased through the processing, and thus the printing apparatus 200 can provide a document easier to read for the user. In addition, as the low-density part has been erased, the printing apparatus 200 further can reduce the amount of the used ink. Further, the image to be printed by the printing apparatus 200 is the image only having the character. Compared with the pictures such as a photograph, a painting and the like, the shade of the character is set apparently, as a result, in most cases, the user can recognize a character in the image as the character even if the low-density part is erased. Even if several characters in the image cannot be determined, the user can recognize what the characters are from the context. Thus, even if the image process section 294 executed the processing for erasing the low-density part, the user can read the printed document without any problem.

Further, the printing control section 296 executes no printing of an image in a case in which the character part is not found in the image. Thus, the printing apparatus 200 doesn't execute a useless printing, which further reduces the amount of used ink.

Embodiment 2

The printing apparatus 200 according to the embodiment 1 erased the part other than the character part from the image. However, the printing apparatus 200 may erase the picture part from the image. The picture part refers to an area where the pictures such as a photograph, a painting, and the like are recorded in the image indicated by printing data (image data). Hereinafter, a printing system 1 comprising a printing apparatus 200 of the embodiment 2 is described. Further, the hardware constitution of the printing system 1 is the same as that in the embodiment 1, and repetitive description is omitted. The operation of the printing apparatus 200 is described below.

Figure 6:
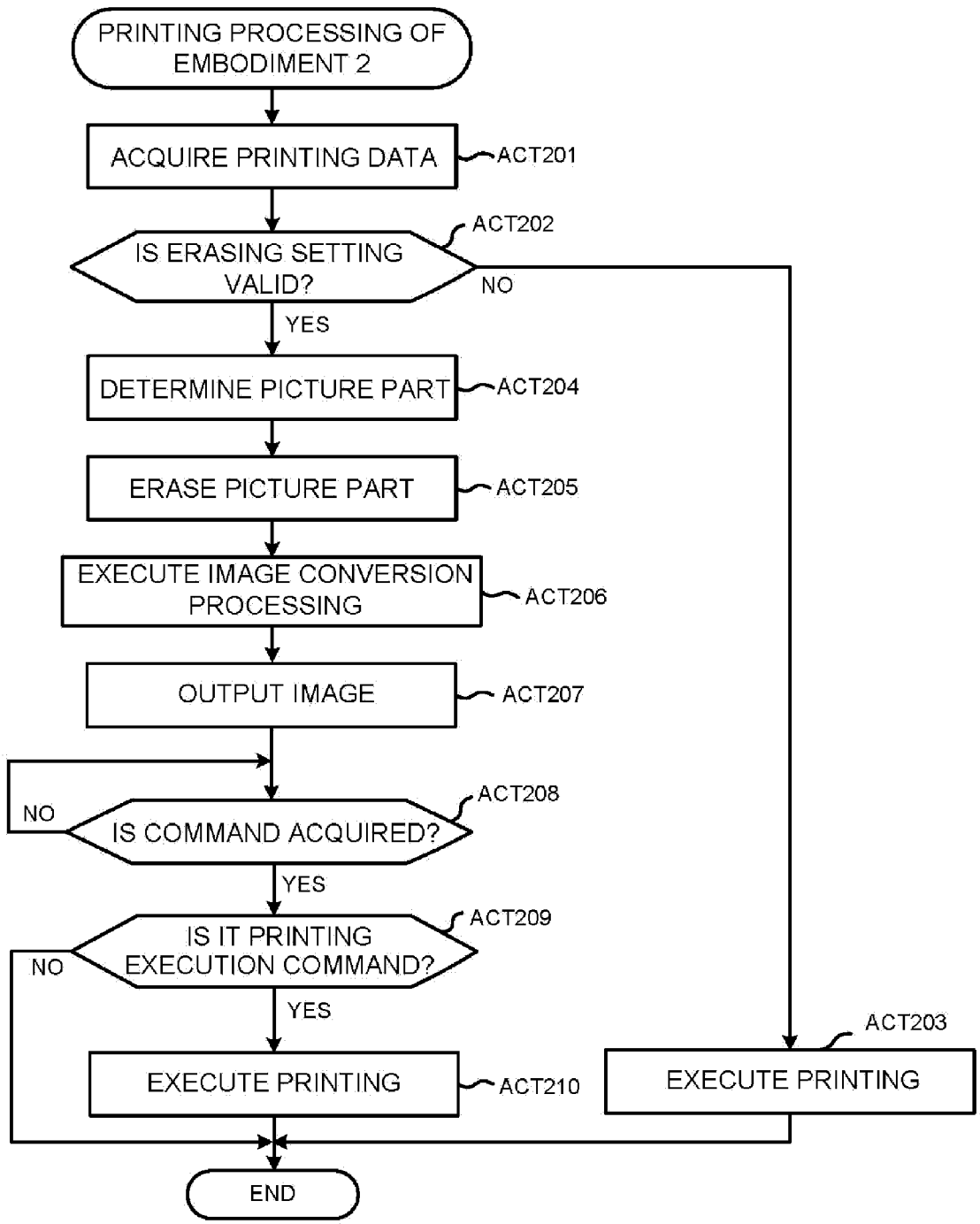
FIG. 6 is a flowchart illustrating a printing processing according to an embodiment 2.

The control section 290 of the printing apparatus 200 starts a printing processing when receiving a printing start command from a user. Hereinafter, the printing processing is described with reference to the flowchart in FIG. 6.

The data acquisition section 291 acquires printing data from the image reading section 250 or the user terminal 100 (ACT 201). Further, for facilitating the understanding, it is assumed in the embodiment 2 that the printing data (image data) acquired by the data acquisition section 291 is set to the image data of one page, which is different from that in the embodiment 1. In order to be capable of printing the printing data consisting of image data of a plurality of pages, it is also possible for the printing apparatus 200 of the embodiment 2 to deform the following processing.

Sequentially, the processing selection section 292 determines whether or not an erasing setting is valid (ACT 202). In the embodiment 2, the erasing setting is used to determine whether the printing apparatus 200 prints the printing data directly or prints the printing data after the picture part is erased.

In a case in which the erasing setting is invalid (NO in ACT 202), the printing control section 296 controls the printing section 270 to print the printing data acquired in ACT 201 directly (ACT 203).

In a case in which the erasing setting is valid (YES in ACT 202), the image determination section 293 determines the picture part in the image indicated by the printing data (ACT 204). At this time, the image determination section 293 may determine an area where color is widely used as the picture part. For example, the image determination section 293 may determine the picture part as follows.

First, the image determination section 293 divides the image indicated by the printing data into a plurality of blocks. Then, the image determination section 293 counts the number of used colors for each block. Then, the image determination section 293 determines that the block in which the counted number is larger than a pre-set value is the picture part, and determines that the block in which the counted number is smaller than the pre-set value is not the picture part.

Further, the image determination section 293 may determine the area where the density in the middle is higher as the picture part. For example, the image determination section 293 may determine the picture part as follows.

First, the image determination section 293 divides the image indicated by the printing data into a plurality of blocks. Then, the image determination section 293 calculates, for each block, the percentage of the pixel value having an intermediate density value. The intermediate density value refers to a density value representing an intermediate density that is neither high nor low. For example, the intermediate density value may be a density value within a range from a first density value (that is set as the initial value of the printing apparatus 200) to a second density value (that is greater than the first density value). Then, the image determination section 293 determines that the block in which the calculated percentage is greater than a pre-set percentage is the picture part, and determines that the block in which the calculated percentage is smaller than the pre-set percentage isn't the picture part. Further, the determination method of the picture part is not limited to those described above, and various existing methods may be used.

When the determination on the picture part is completed, the image process section 294 erases the picture part from the image (ACT 205). For example, the image process section 294 replaces the pixel value of the picture part determined in ACT 204 with 0 or a value that indicates the white. In the following description, similar to that in the embodiment 1, the image in which the picture part is erased is referred to as an erased image.

Sequentially, the image process section 294 executes, for the erased image generated in ACT 205, a conversion processing used for making the image to be seen more easier (ACT 206). For example, the image process section 294 executes a processing for erasing a low-density part from the erased image. The processing for erasing the low-density part is carried out in the same method as that described in ACT 107 in the embodiment 1.

When the conversion processing is completed, the output control section 295 outputs the processed image generated in ACT 206 to the user. For example, in a case where a printing is started based on the printing start command received from the operation section 240, the output control section 295 displays the processed image on the display section 230. Further, in a case where a printing is started based on the printing start command received from the user terminal 100, the output control section 295 sends the processed image to the user terminal 100 (ACT 207).

The processing selection section 292 determines whether or not the command of user is received from the operation section 240 or the user terminal 100 (ACT 208). In a case in which the command is not received (NO in ACT 208), the processing selection section 292 repeats the processing in ACT 208 until the command is received (ACT 208). In a case in which the command is received (YES in ACT 208), the processing selection section 292 carries out the processing in ACT 209.

In a case in which the received command is a printing stop command (NO in ACT 209), the printing control section 296 ends the printing processing without executing a printing of the processed image generated in ACT 206.

In a case in which the received command is a printing execution command (YES in ACT 209), the printing control section 296 executes a printing of the processed image generated in ACT 206 (ACT 210). When the printing is completed, the printing control section 296 ends the printing processing.

According to the present embodiment, since the image process section 294 has erased the picture part from the image, the printing apparatus 200 can provide a document easy to read and having no picture part for the user. In addition, because the part other than the character part has been erased, it is possible to reduce the amount of the ink used in the printing by the printing apparatus 200.

Further, the image process section 294 further erases the low-density part from the image after the picture part is erased. In a case where there is a thin background image behind the character, the background image is also erased through the processing, and thus the printing apparatus 200 can provide a document easier to read for the user. In addition, as the low-density part has been erased, the printing apparatus 200 further can reduce the amount of the used ink.

Further, the printing control section 296 executes a printing of the processed image only in a case where the printing execution command is acquired from the user after the output control section 295 output the processed image. Thus, the printing apparatus 200 doesn't execute a useless printing, which further reduces the amount of used ink.

Embodiment 3

In the embodiments 1 and 2, the printing apparatus executes the erasing of the part other than the character part or the erasing of the picture part. However, an image processing apparatus having no printing function may also execute the erasing of the part other than the character part or the erasing of the picture part. Hereinafter, an image processing apparatus according to an embodiment 3 is described.

Figure 7:
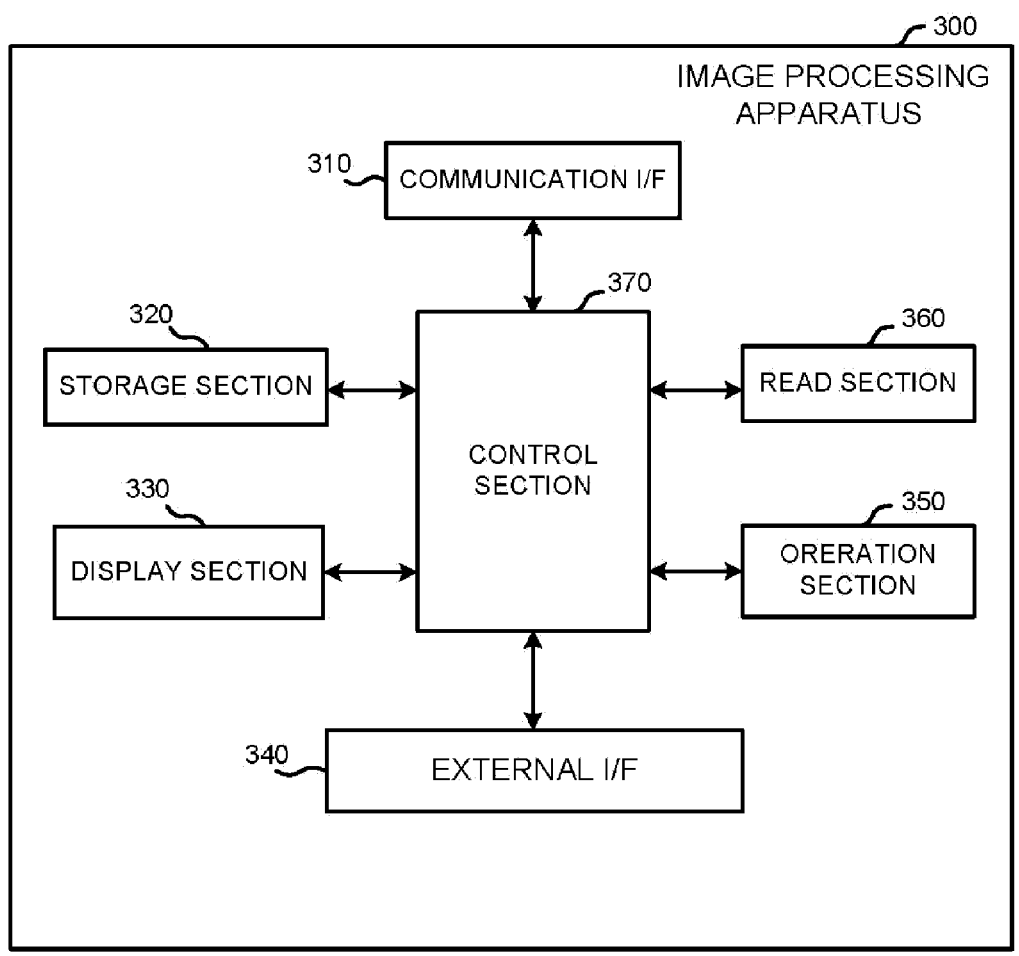
FIG. 7 is a block diagram illustrating an image processing apparatus according to an embodiment 3.

An image processing apparatus 300 according to the embodiment 3 is, for example, an apparatus having a data processing function such as a personal computer, a server apparatus and the like. As shown in FIG. 7, the image processing apparatus 300 includes a communication interface 310, a storage section 320, a display section 330, an external interface 340, an operation section 350, a read section 360 and a control section 370.

The communication interface 310 is a network connection interface for connecting the image processing apparatus 300 with a network. The communication interface 310 communicates with a machine (for example, a user terminal) connected therewith through a network according to the control of the control section 370.

The storage section 320 is a storage device capable of reading and writing data such as a DRAM, an SRAM, a flash memory, a hard disc and the like. Various data used by the control section 370 is stored in the storage section 320.

The display section 330 is a device used for outputting various kinds of information to the user. The display section 330 is a display device such as a liquid crystal display, an organic EL display, and the like. The display section 330 displays an image according to the control of the control section 370.

The external interface 340 is an external machine connection interface used for connecting with an external machine such as a display, a speaker, a printer and the like. The external interface 340 is, for example, a USB interface for connecting with a USB (Universal Serial Bus) machine through a USB cable, or a video output interface for outputting a video on a display. The external interface 340 communicates with the external machine according to the control of the control section 370.

The operation section 350 is a user interface such as a keyboard, a mouse, a touch panel and the like. The operation section 350 notifies the control section 370 of an input from the user.

The read section 360 reads data from a recording medium such as an optical disc, a semiconductor memory and the like. The read section 360 reads the data from the recording medium according to the control of the control section 370.

The control section 370 is a processing device such as a processor and the like. The control section 370 controls the image processing apparatus 300. The control section 370 operates according to a program stored in an ROM (not shown) or an RAM (not shown) to realize various operations including a later-described "image process processing".

Figure 8:
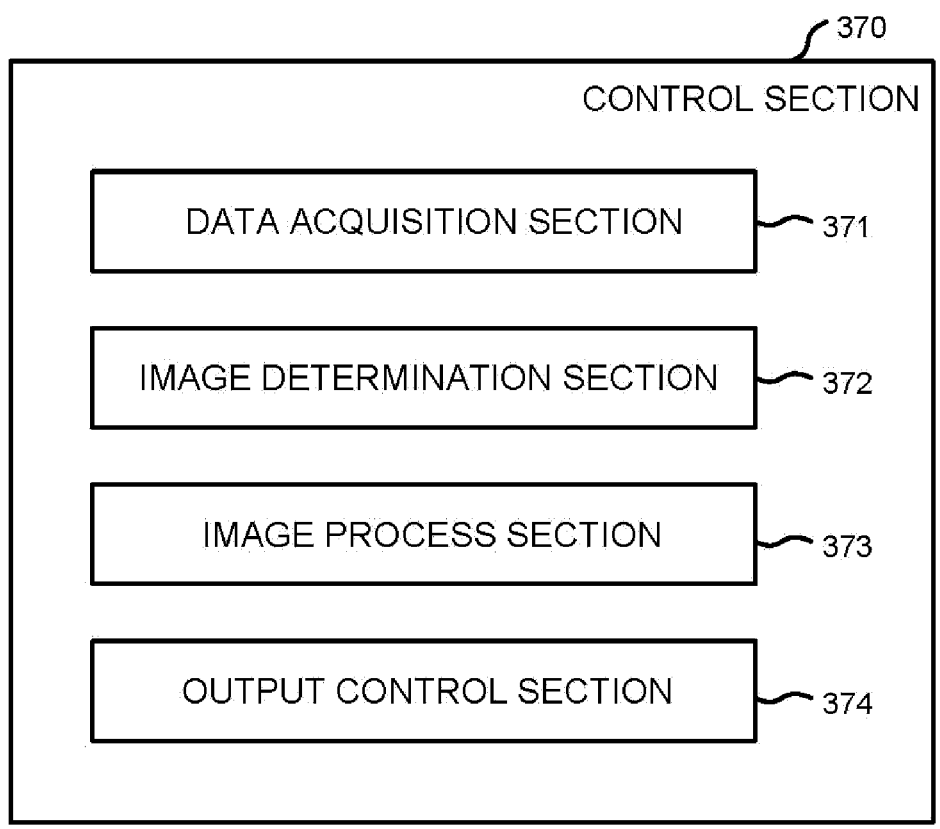
FIG. 8 is a functional block diagram illustrating a control section provided in the image processing apparatus according to the embodiment 3.

By operating according to the program described above, the control section 370 functions as a data acquisition section 371, an image determination section 372, an image process section 373, and an output control section 374, as shown in FIG. 8. Operations of the data acquisition section 371 to the output control section 374 are described in the later-described image process processing. Further, the control section 370 may be one processor, or a plurality of processors.

Next, the operations of the image processing apparatus 300 with such a constitution are described.

Figure 9:
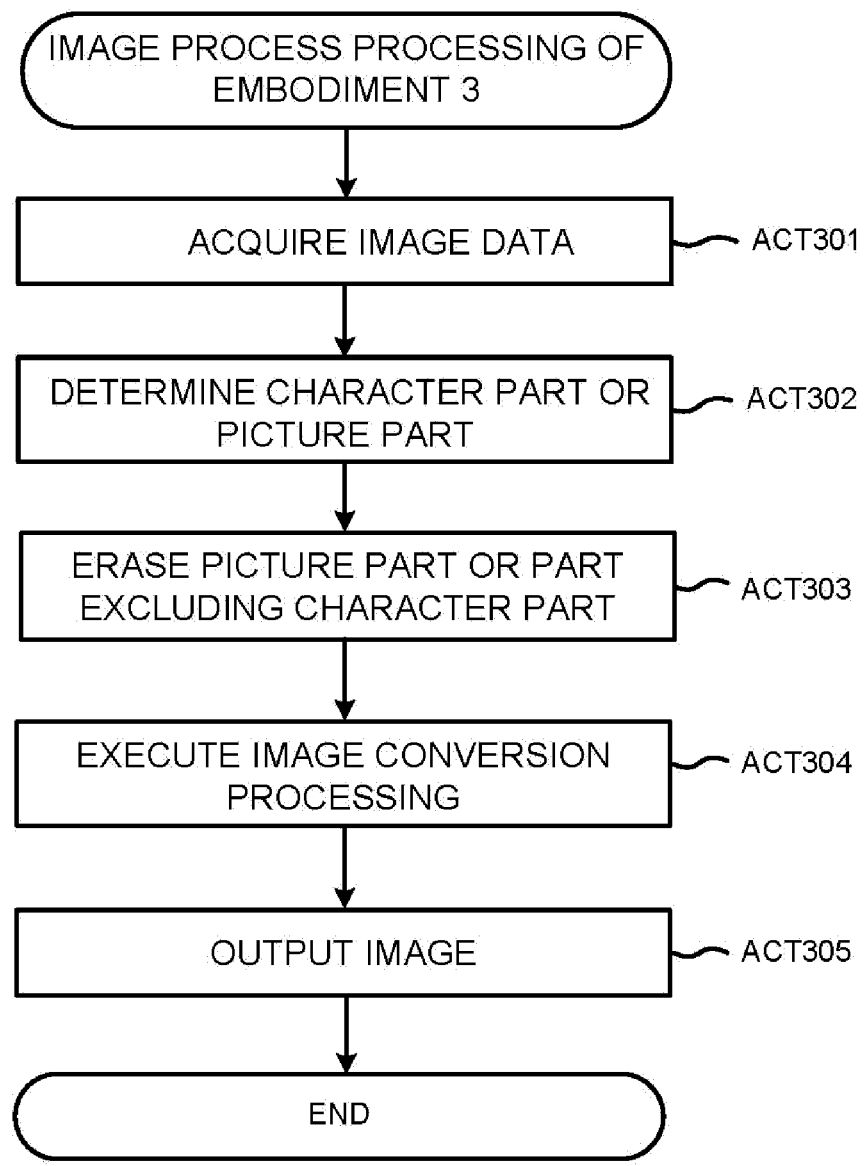
FIG. 9 is a flowchart illustrating an image process processing according to the embodiment 3.

If a processing start command is received from the user, the control section 370 of the image processing apparatus 300 starts an image process processing. The processing start command may be sent from the operation section 350, or sent from a user terminal connected with a network. Hereinafter, an image process processing is described with reference to the flowchart in FIG. 9.

The data acquisition section 371 acquires image data (ACT 301). The image data may be the image data acquired by the read section 360, or the image data received through the external interface 340. Further, the image data may also be the image data received from the user terminal via a network.

The image determination section 372 determines the character part or the picture part in the image indicated by the image data (ACT 302). At this time, the image determination section 372 may determine the character part in the same method as that described in ACT 104 of the embodiment 1. Further, the image determination section 372 may determine the picture part in the same method as that described in ACT 204 of the embodiment 2.

Sequentially, the image process section 373 erases the picture part or the part other than the character part from the image (ACT 303). In the following description, similar to those in the embodiments 1 and 2, the image in which the picture part or the part other than the character part is erased is referred to as an erased image.

Sequentially, the image process section 373 executes, for the erased image generated in ACT 303, a conversion processing used for making the image to be seen more easier (ACT 304). For example, similar to those in the embodiments 1 and 2, the image process section 373 executes a processing for erasing a low-density part from the erased image.

The output control section 374 outputs an image (hereinafter, referred to as processed image) processed by the image process section 373 (ACT 305). For example, the output control section 374 may generate an image file based on the processed image, and store the generated image file in the storage section 320. In a case in which the printing start command is received from the user terminal, the image file may be sent to the user terminal. Further, the output control section 374 may display the processed image on the display section 330. Further, the output control section 374 may output the processed image to an external device (for example, a display device or a printing device) connected through the external interface 340. Further, the processed image may be the erased image generated in ACT 303, or the image generated in ACT 304. When the output of the processed image is completed, the control section 370 ends the printing processing.

According to the present embodiment, the image process section 373 erases the picture part or the part other than the character part from the image, and in this way, the image processing apparatus 300 can provide a document easy to read for the user.

Further, the image process section 373 further erases the low-density part from the image after the part other than the character part is erased. In a case where there is a thin background image behind the character, the background image is also erased through the processing, and thus the image processing apparatus 300 can provide a document easier to read for the user.

Further, each of the embodiments described above is exemplified as an example, respectively. As to each of the embodiments described above, various changes and applications are possible.

It is exemplified in the embodiments 1 and 2 that, for example, the printing apparatus 200 is described as a copier. However, the printing apparatus 200 is not limited to the copier. The printing apparatus 200 may be a FAX, or only a printer.

Further, it is exemplified in the embodiment 3 that the image processing apparatus 300 is described as an apparatus having no printing function. However, the image processing apparatus 300 may be an apparatus having a printing function. In this case, the image processing apparatus 300 may be referred to as a printing apparatus. Further, the printing apparatus 200 in the embodiments 1 and 2 may also be referred to as an image processing apparatus.

Further, in each embodiment described above, the image process section 294 and the image process section 373 further execute the conversion processing for making the image to be seen easily after the erased image is generated. However, the image process section 294 and the image process section 373 may not execute the conversion processing.

In each embodiment described above, the image process sections 294 and 373 further erased the low-density part from the erased image after the erased image is generated. However, the processing executed by the image process sections 294 and 373 may be a processing for converting the erased image into a binary image, rather than the processing for erasing the low-density part. As to the conversion method of binary image, various existing methods may be used. For example, the image process sections 294 and 373 convert the image into a gray-scale image, and binarize the pixel values in the gray-scale image by taking a pre-set density value as a threshold value. In a case where there is a thin background image behind the character, the background image is also erased through the processing, and thus the printing apparatus 200 and the image processing apparatus 300 can provide documents easier to read for the user. In addition, the low-density part is erased by converting into the binary image, thus, it is possible to reduce more amount of ink used in the printing by the printing apparatus 200.

Further, the image process sections 294 and 373 may execute a low-density processing for the erased image after the erased image is generated. The low-density processing is a processing to make the image at a low density. For example, the image process sections 294 and 373 may execute a processing for shifting the density level (density value) to the low level side for all pixels contained in the erased image. The pixel of which the density level is less than 0 may be set to a pixel of which the density level is 0. At this time, the image process sections 294 and 373 may shift the density level to the low level side after the density level is compressed (for example, after being compressed from 256-gradation levels to 128-gradation levels) Since the density of the whole image is reduced, the amount of ink used in the printing by the printing apparatus 200 may be further reduced.

Further, the image process section 294 may convert the processed image into an image having only one color. At this time, the image process section 294 selects, from a plurality of ink different in color, the ink of which the ink residual amount is greater than a pre-set amount, and converts the processed image into an image having the color of the selected ink. In a case where there is a plurality of ink of which the ink residual amount is greater than the pre-set amount, the ink having a lowest use frequency among the plurality of ink may be selected. At this time, the image process section 294 may select the ink having the lowest use frequency based on the order of use frequency of ink pre-set as an apparatus initial value. The order of use frequency of ink may be set by the user, or learnt and determined according to the past printing conditions of the printing apparatus 200. The ink can be used effectively.

Further, the printing apparatus 200 of the embodiment 1 executes a printing without outputting the processed image. However, the printing apparatus 200 may also execute a printing of the processed image only in a case where the printing execution command is acquired from the user after the processed image is output, similar to the printing apparatus 200 of the embodiment 2. In this way, the printing apparatus 200 doesn't execute a useless printing, thereby reducing the amount of ink used by the printing apparatus 200.

The control sections for controlling the printing apparatus 200 and the image processing apparatus 300 of the present embodiment may be realized through a dedicated computer system, or a general computer system. For example, a program for executing the operations described above may be stored in and distributed to a recording medium that can be read by a computer such as an optical disc, a semiconductor memory, a magnetic tape, a flexible disc and the like, and installed in the computer to execute the processing described above. Further, the program may be stored in a disc device provided in a server apparatus in a network such as the internet, and downloaded in the computer. Further, the above-mentioned functions may be achieved through cooperating with an OS (Operating System) and an application soft. In this case, the part other than the OS may be stored in and distributed to a medium, or stored in the server apparatus and then downloaded in the computer.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A printing apparatus, comprising:
a data acquisition section configured to acquire printing data;
an image determination section configured to determine a character part or a picture part of an image indicated by the printing data;
an image process section configured to erase the picture part or the part other than the character part from the image indicated by the printing data, and then determines a pixel of which a density value is lower than a pre-set density value in the image for which erasing has been executed, and then replaces a pixel value of the determined pixel with 0 or a value that indicates white; and
a printing control section configured to execute a printing of an image processed by the image process section.

2. The printing apparatus according to claim 1, wherein the image determination section determines the character part of the image indicated by the printing data; and
the image process section erases the part other than the character part from the image indicated by the printing data.

3. The printing apparatus according to claim 2, wherein the printing control section executes, in a case where the character part in the image is found by the image determination section, a printing of the image processed by the image process section; and executes, in a case where the character part in the image isn't found by the image determination section, no printing of the image in which the character part isn't found.

4. The printing apparatus according to claim 1, wherein the image determination section determines the picture part of the image indicated by the printing data; and
the image process section erases the picture part from the image indicated by the printing data.

5. The printing apparatus according to claim 1, further comprising:
an output control section configured to output a processed image processed by the image process section before the printing control section executes a printing of an image, wherein
the printing control section executes, in a case where a printing execution command is acquired from the user after the output control section output the processed image, a printing of the processed image; and executes, in a case where a printing stop command is acquired from the user after the output control section output the processed image, no printing of the processed image.

6. An image processing apparatus, comprising:
a data acquisition section configured to acquire image data;
an image determination section configured to determine a character part or a picture part of an image indicated by the image data;
an image process section configured to erase the picture part or the part other than the character part from the image indicated by the image data, and then determines a pixel of which a density value is lower than a pre-set density value in the image for which erasing has been executed, and then replaces a pixel value of the determined pixel with 0 or a value that indicates white; and
an output control section configured to output an image processed by the image process section.

* * * * *